US012010012B2

(12) United States Patent
Means et al.

(10) Patent No.: US 12,010,012 B2
(45) Date of Patent: Jun. 11, 2024

(54) APPLICATION-AWARE BGP PATH SELECTION AND FORWARDING

(71) Applicant: AT&T Intellectual Property I, L.P., Atlanta, GA (US)

(72) Inventors: Israel Means, Chula Vista, CA (US); Barry Elia, King George, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/520,128

(22) Filed: Nov. 5, 2021

(65) Prior Publication Data

US 2023/0144568 A1 May 11, 2023

(51) Int. Cl.

| | |
|---|---|
| ***H04L 45/302*** | (2022.01) |
| ***H04L 45/02*** | (2022.01) |
| ***H04L 45/24*** | (2022.01) |
| ***H04L 45/42*** | (2022.01) |
| ***H04L 45/74*** | (2022.01) |

(52) U.S. Cl.

CPC ............ *H04L 45/306* (2013.01); *H04L 45/02* (2013.01); *H04L 45/04* (2013.01); *H04L 45/24* (2013.01); *H04L 45/42* (2013.01); *H04L 45/74* (2013.01)

(58) Field of Classification Search

CPC ....... H04L 45/306; H04L 45/02; H04L 45/04; H04L 45/24; H04L 45/42; H04L 45/74

See application file for complete search history.

(56) References Cited

U.S. PATENT DOCUMENTS

2006/0174035 A1* 8/2006 Tufail ..................... H04L 45/02 709/239
2006/0215577 A1* 9/2006 Guichard ............. H04L 45/121 370/254
2009/0182874 A1* 7/2009 Morford ................ H04L 43/08 709/224

(Continued)

*Primary Examiner* — Jimmy H Tran

(74) *Attorney, Agent, or Firm* — Guntin & Gust, PLC; Atanu Das

(57) ABSTRACT

A routing structure is defined for provider edge (PE) routers that will create the ability to recompute best paths based on application criteria. The routing structure may include the use of a network controller which is connected with the internet to receive requests from applications to trigger path re-computation. The controller will peer with PEs to send re-computation information used by the PE to construct an application-aware BGP table and forwarding instance. The PE also defines a new BGP and packet filter to replicate specific BGP paths into the application-aware table. The application-aware BGP and forwarding instance is unique to the requesting application. Thus, each request with a different source/destination combination obtains a discrete table providing separation. When a packet enters the PE from customer edge (CE) or core interface the packet traverses a packet filter that when matched against source/destination is redirected to the appropriate application-aware forwarding table. Once in the application-aware table the packet is then forwarded along the application-aware path achieving the objective. The instantiation of the application-aware BGP and forwarding table is be done based on BGP updates learned from the controller.

20 Claims, 5 Drawing Sheets

(56) References Cited

U.S. PATENT DOCUMENTS

| | | | | |
|---|---|---|---|---|
| 2010/0008363 | A1* | 1/2010 | Ee | H04L 45/72 370/392 |
| 2010/0227581 | A1* | 9/2010 | Cook | H04W 4/02 455/411 |
| 2015/0016456 | A1* | 1/2015 | Ramanathan | H04L 45/306 370/392 |
| 2015/0207726 | A1* | 7/2015 | Hallivuori | H04L 45/24 370/389 |
| 2016/0234099 | A1* | 8/2016 | Jiao | H04L 45/02 |
| 2017/0279726 | A1* | 9/2017 | Coffman | H04L 45/3065 |
| 2018/0006935 | A1* | 1/2018 | Mutnuru | H04L 67/1001 |
| 2018/0159957 | A1* | 6/2018 | Hooda | H04L 67/63 |
| 2018/0160160 | A1* | 6/2018 | Swaminathan | H04N 21/816 |
| 2018/0351863 | A1* | 12/2018 | Vairavakkalai | H04L 45/02 |
| 2019/0288949 | A1* | 9/2019 | Pfister | H04L 47/125 |
| 2021/0006485 | A1* | 1/2021 | Toyozumi | H04L 12/4633 |
| 2021/0126844 | A1* | 4/2021 | Haddow | H04L 41/0253 |
| 2022/0021599 | A1* | 1/2022 | Hitz | H04L 45/04 |
| 2022/0086681 | A1* | 3/2022 | Kwok | H04W 80/08 |
| 2022/0182317 | A1* | 6/2022 | Thoria | H04L 45/50 |
| 2022/0255848 | A1* | 8/2022 | Bajaj | H04L 45/22 |
| 2022/0272029 | A1* | 8/2022 | Vasseur | H04L 45/02 |
| 2022/0278922 | A1* | 9/2022 | Kolar | H04L 43/087 |
| 2022/0294738 | A1* | 9/2022 | Vasseur | H04L 47/127 |
| 2022/0329479 | A1* | 10/2022 | Ramachandran | H04L 47/825 |
| 2022/0360567 | A1* | 11/2022 | Vasseur | H04L 63/166 |
| 2022/0376998 | A1* | 11/2022 | Vasseur | H04L 43/12 |
| 2022/0417323 | A1* | 12/2022 | Julien | H04L 67/51 |
| 2023/0275829 | A1* | 8/2023 | Hu | H04L 45/306 709/245 |

* cited by examiner

APPLICATION-AWARE BGP PATH SELECTION AND FORWARDING

BACKGROUND

Companies have begun offering a new cloud computing option that promises reduced costs, improved availability, improved scalability, and reduced time to deploy new applications. These companies act as managed service providers that rent virtual computer, storage, and Internet connectivity services for variable periods. Large clouds often have functions distributed over multiple locations, each location being a data center. The operation and management of a large-scale cloud is often difficult even with skilled operators.

This background information is provided to reveal information believed by the applicant to be of possible relevance. No admission is necessarily intended, nor should be construed, that any of the preceding information constitutes prior art.

SUMMARY

A routing structure is defined for provider edge routers that will create the ability to recompute best paths based on application criteria. In an example, a method may include receiving a request from a user end device via an application programming interface (API); translating that request into network specific data; based on the translated request, spinning up a new instance on a provider edge router (e.g., new routing instance); and selectively placing border gateway protocol updates based on the new instance. In this example, the best path selection process may be customized in the context of BGP to be more application centric.

In another example, an apparatus may include a processor and a memory coupled with the processor that effectuates operations. The operations may include receiving, by a provider edge (PE) device, application network requirements for an application; receiving data; determining that the data is indicative of data with the application; and when the application identified data is received, using an application forwarding table to direct the data to a next hop.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

The network industry as a whole is experiencing a monumental shift from on-prem application processing to cloud-based processing. This shift has created a need to develop application-aware network functions that improve the cloud experience. Enabling network functions that are driven by cloud application may increase from nascent to becoming the dominate design approach. An example of application-aware network function is the ability to dynamically select border gateway protocol (BGP) paths based on criteria from the application versus internal network metrics. As real-time cloud applications mature there is a need to call upon the network to deliver paths that exhibit low packet loss, low latency, and less congestion and to do so on-demand.

The persistent challenge with Cloud computing is the lack of the ability to reflect network intent upon the conventional layer 3 internet protocol infrastructure. This challenge is exacerbated by the disjointed metrics employed by conventional network versus the application performance metrics required by applications. Network metrics such as interior gateway protocols (IGP) cost and BGP path attributes are centric to network and only imply such metrics are relevant to applications. Application metrics involve aspect that impact the end user expertise such as packet loss, latency, and congestion. Currently, applications don't have an elegant method to inform the network of a better path for application performance but seen as non-best from the perspective of the network. The state of the art in the space has primarily focused on the network mapping such identifying paths though the network but not actively influencing path selection. Existing art have also focused on active measurements but lacks the ability to trigger network path re-computation based on application needs.

The disclosed subject matter defines a routing structure that may create the ability to recompute best paths based on application criteria.

Figure 1:
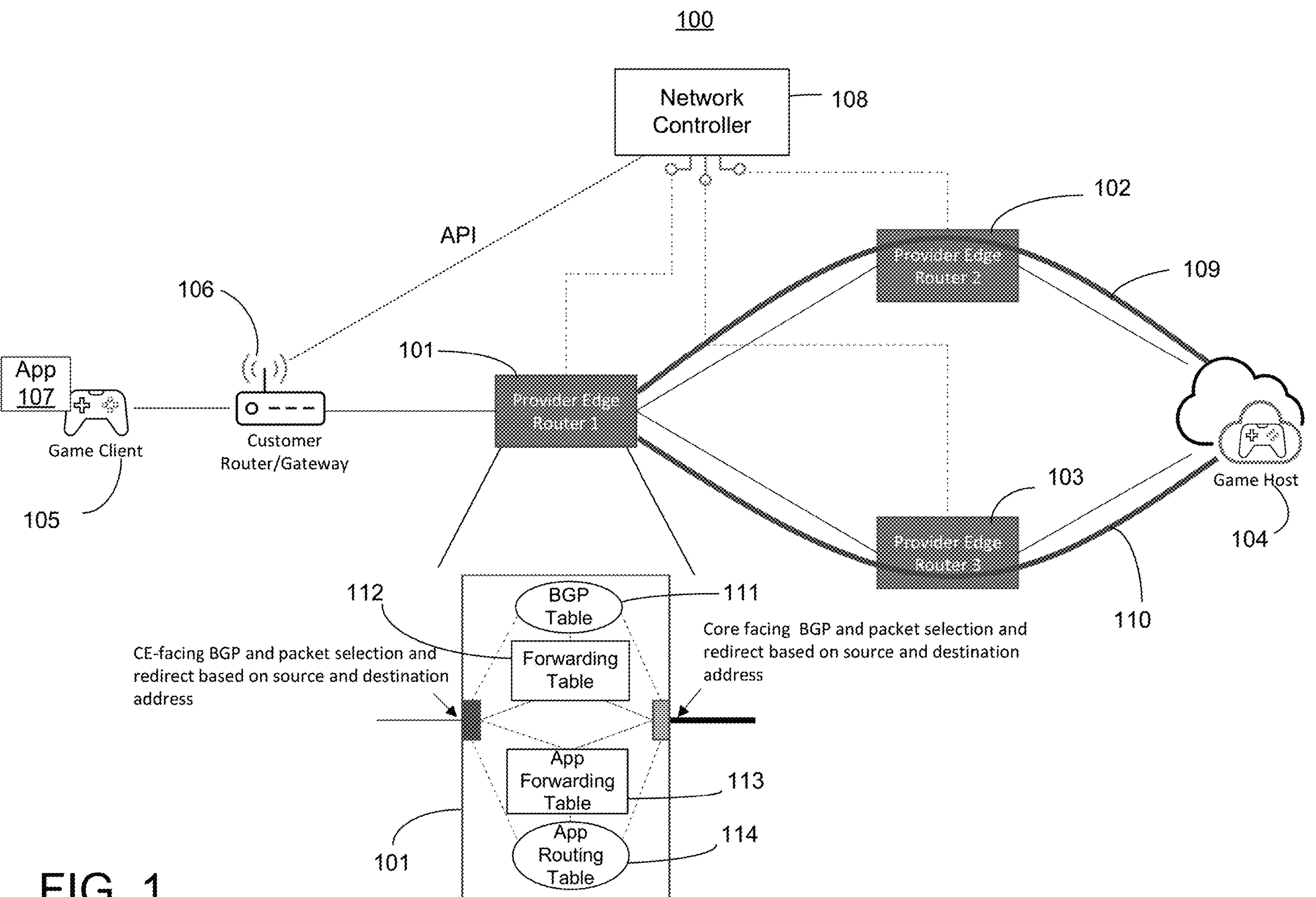
FIG. 1 illustrates an exemplary system for application-aware BGP path selection and forwarding, among other things.

FIG. 1 illustrates an exemplary system 100 for using application-aware BGP path selection and forwarding, among other things. System 100 may include devices, such as game client 105, gateway 106, network controller 108, game host 104, provider edge (PE) router 101, provider edge router 102, or provider edge router 103. The devices of system 100 may be communicatively connected with each other. Gateway 106 or other devices may communicate with network controller 108 via an application programming interface or in other ways to communicate routing preferences for data to or from game client 105 and for a particular application, such as application 107. Network controller 108 may communicate performance preferences of the application to devices in the network, such as provider edge router 101, provider edge router 102, or provider edge router 103. Provider edge router 101 may include different functions, such as routing table 111 (e.g., BGP routing table), forwarding table 112, application forwarding table 113, or application routing table 114. In an example, provider edge may have customer edge facing interface for BGP and packet selection and redirect based on source and destination address, as well as a core facing interface for BGP and packet selection and redirect based on source and destination address. In this example, for simplicity, there may be two routes between provider edge router 101 and game host 104, such as route 109 or route 110.

In an exemplary scenario, as shown in FIG. 1 for simplicity, there are two paths to game host 104, such as route 109 via PE 102 and route 110 via PE 103. Route 109 may be chosen based on routing metrics, such as interior gateway protocol (IGP) metric and BGP attributes (e.g., as local-preference (LP) or autonomous system path length (AS-path)). Conventionally, the best path selection criteria for PE 101 may be based on path attributes, not application needs. While conventional best path selection can produce the best path in terms of routing metrics, it may not provide the best path from an application performance perspective. Metrics such as packet loss, network congestion, or latency are not considered as part of the BGP best path selection algorithm. PE 101 may be enhanced with a new function that permits application-aware path selection based on source and destination addresses. PE 101 may incorporate a technique that identifies the source address of the incoming packet and forwards to the best next-hop based on application criteria. Application forwarding table 114 may be dynamically created on PE 101 and may be limited to source and destination addresses representing application that explicitly requests alternate path forwarding to achieve improved application performance metrics. The following may be aspects of the application routing table: 1) a packet identifier function and redirect action; and 2) an application routing path selection function.

Figure 2:
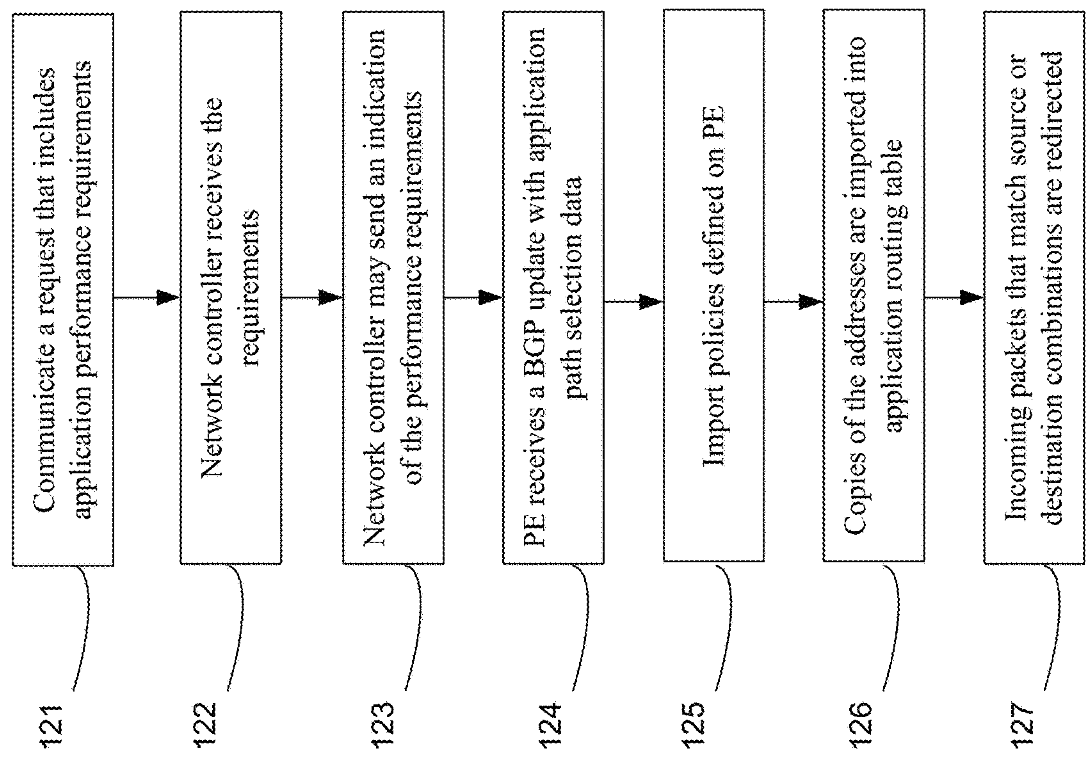
FIG. 2 illustrates an exemplary method for application-aware BGP path selection and forwarding, among other things.

FIG. 2 illustrates an exemplary method for enabling application-aware path selection and forwarding, among other things. At step 121, application 107 of game client 105 may communicate a request that includes performance requirements (e.g., criteria or thresholds) via an application programming interface (API), web form, or the like. At step 122, network controller 108 receives the requirements of step 121. At step 123, network controller 108 may send an indication of the performance requirements for application path selection and forwarding to the relevant PEs (e.g., PE 101, PE 102, or PE 103) using standard protocols, such as border gateway protocol (BGP). In an example, the relevant PEs may initially be determined by conventional routing protocol logic and then further refined based on the application path selection and forwarding logic as disclosed herein. In an example scenario, network controller 108 sends BGP updates with source and destination on individual updates and includes a BGP community value (BGP-CV) on each update. The BGP-CV is common between source and destination. PE 101 may be defined with logic that permits parsing BGP updates and inspecting for a specific BGP-CV from a pre-defined range. When the specific BGP-CV is discovered, PE 101 may create a new application-aware BGP table (BGP-CV driven routing instance creation), both addresses with the same common BGP-CV is added to the same application-aware BGP table, the addresses also remain in the standard global table for other flows. Route reflectors in the network are updated with route policies to apply the common and source and destination specific BGP-CVs.

At step 124, PE 101 receives a BGP update with application path selection data, which may include source and destination information. Application forwarding table 113 (e.g., an application routing table) may be generated to be unique to the source and destination. Similar application forwarding tables 113 may be in PE 102 or PE 103. PE 101 may be defined with logic that permits parsing BGP updates and inspecting for a specific BGP-CV from a pre-defined range. When the specific BGP-CV is discovered, PE 101 may create a new application-aware BGP table (BGP-CV driven routing instance creation), both addresses with the same common BGP-CV may be added to the same application-aware routing table 114, the addresses also remain in the standard global table 111 for other flows. Route reflectors in the network may be updated with route policies to apply the common and source and destination specific BGP-CVs.

With continued reference to FIG. 2, at step 125, import policies may be defined on PE 101 that are tied to the CE-facing interface that represents the source and the core-facing interface that learns the destination. At step 126, upon matching BGP advertisements (or other routing advertisements) representing source and destination from CE and core facing BGP session, copies of the addresses are imported into application routing table 114. Packets filters with a re-direct function are applied to core and CE-facing interfaces. At step 127, incoming packets that match source or destination combinations are redirected to application forwarding instance of application forwarding table 113. The redirect is a local instruction set to place a packet in a specific forwarding instance for customized forwarding treatment. Once in the application forwarding path the packet can follow the application-aware path bypassing network issues not reflected in standard path selection algorithms.

Figure 3:
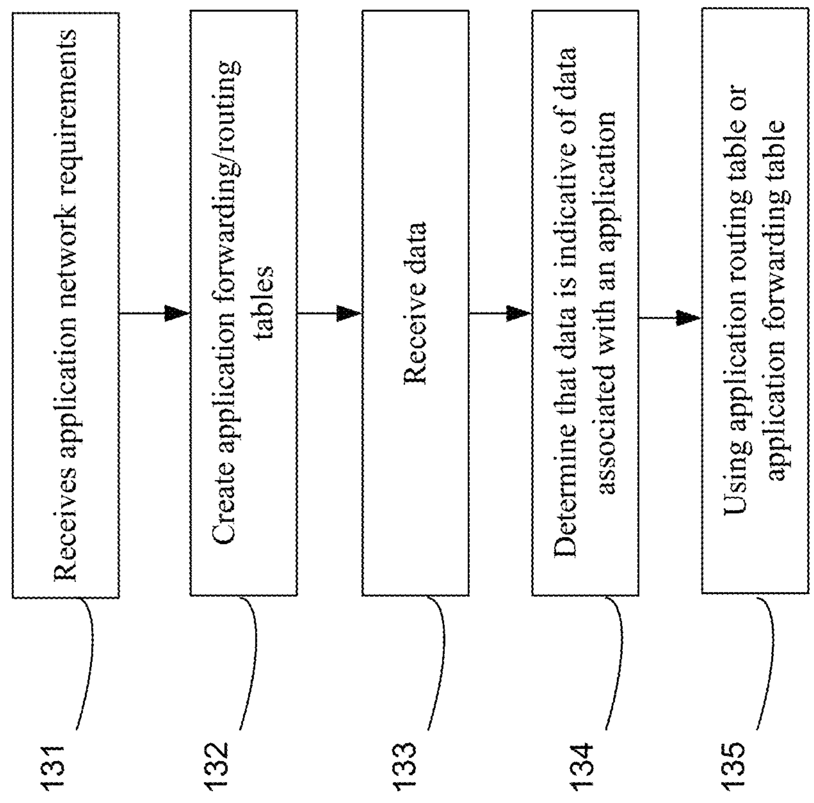
FIG. 3 illustrates an exemplary method for application-aware BGP path selection and forwarding, among other things.

FIG. 3 illustrates an exemplary method for enabling application-aware path selection and forwarding, among other things. At step 131, PE 101 receives application network requirements for application 107. At step 132, PE 101 creates or receives an application forwarding table 113 for application 107 and an application routing table 114 for application 107. Application routing table 114 may include information that identifies data associated with application 107, such as IP addresses, port numbers, protocols, or other identifiers. Although there is an application specific table, PE 101 does not necessarily place all routing or forwarding information into a table to duplicate all of the routes. PE 101 may selectively distribute routing content into application routing table 114 and then subsequently application forwarding table 113 is used. Information associated with application forwarding table 113 for application 107 or application routing table 114 may be sent to PE 101 from another device or sent from PE 101. At step 133, PE 101 receives data. At step 134, PE 101 determines that data is indicative of data to or from a destination or source associated with application 107. At step 135, when application 107 identified data is received by PE 101, then using application routing table 114 or application forwarding table 113 to direct the data to the appropriate next hop. The application metrics may be weighted differently than other standard routing protocols and therefore the route chosen may be different when the application metrics are considered.

The disclosed subject matter creates an approach that evolves the network from a closed paradigm to a network that is responsive to application needs and thereby may improve the application experience. The approach may benefit on-net and off-net applications. Consider an off-net client of a first service provider traversing the network of a second service provider to access a cloud gaming server. Because the second service provider network relies on BGP metrics which do not reflect application needs, the second service provider network can impair the experience because the optimal path is only seen from the perspective of the network, not application 107. The maturation of new network visibility applications is exposing network flows that are suboptimal for application 107. The disclosed subject matter allows for a population of users to operate network visibility tools that expose suboptimal paths for a particular application and request to adjust paths from an improved application experience. The disclosed subject matter allows the ability to create partnerships with cloud providers, gaming companies, and network path optimization software vendors to embed the disclosed application aware functionality directly into code. This capability may transition the responsibility of requesting network path adjustment from human to machine. The ability to dynamically adjust paths based on application is applicable to telemedicine, public safety, financial institutions, and other sectors, these sectors have some form of critical transactions that require low latency, less packet loss or congestion avoidance that go beyond quality-of-service treatment. Note that generally the disclosed subject matter is applicable to user devices that have requested application awareness but not all user applications.

Conventional routing infrastructure does not consider how an application (e.g., a gaming application) can request a better path or better metrics from the network or capability to generate better metrics or move on to a preferred path to achieve improved metrics from the infrastructure. With reference to the example associated with gaming, gaming usually has strict criteria that may be more important to it than bandwidth consumption, for example. So, based on the application itself various different metrics are taken into account that are most important to a gaming application. As disclosed, these application specific metrics may be used to filter and therefore make deterministic routing based on what is the most germane to that application itself.

For additional perspective, conventionally, a game or some other application is programmed to attach to, perhaps, a list of preferred servers (e.g., first preferred server, second preferred server, etc.). If the first server is unable to satisfy the requests due to performance deficiencies, the gaming application will continue down the list. However, the disclosed subject matter, instead of rolling down the list, may stay with the first server, which is preferred, and the gaming application requests the network to make a modification in the network to move the traffic off of the path that it is currently on (e.g., route 109), and place on a different network path (e.g., route 110) that takes it to the same preferred server. The disclosed subject matter may preserve the proximity between the client and the server, but change the path the packet is taking between the two, instead of possibly connecting with a different server that may be further away.

Figure 4:
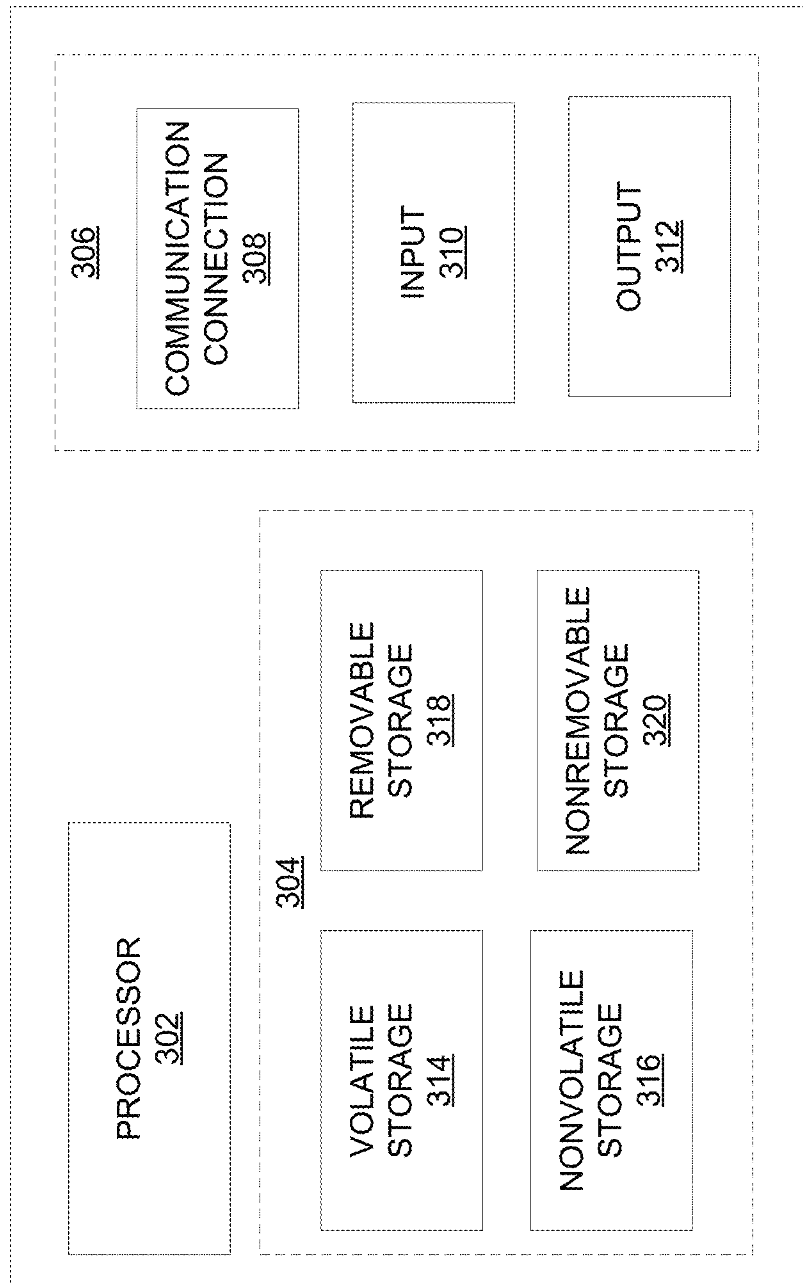
FIG. 4 illustrates a schematic of an exemplary network device.

FIG. 4 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 4 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 4) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 5:
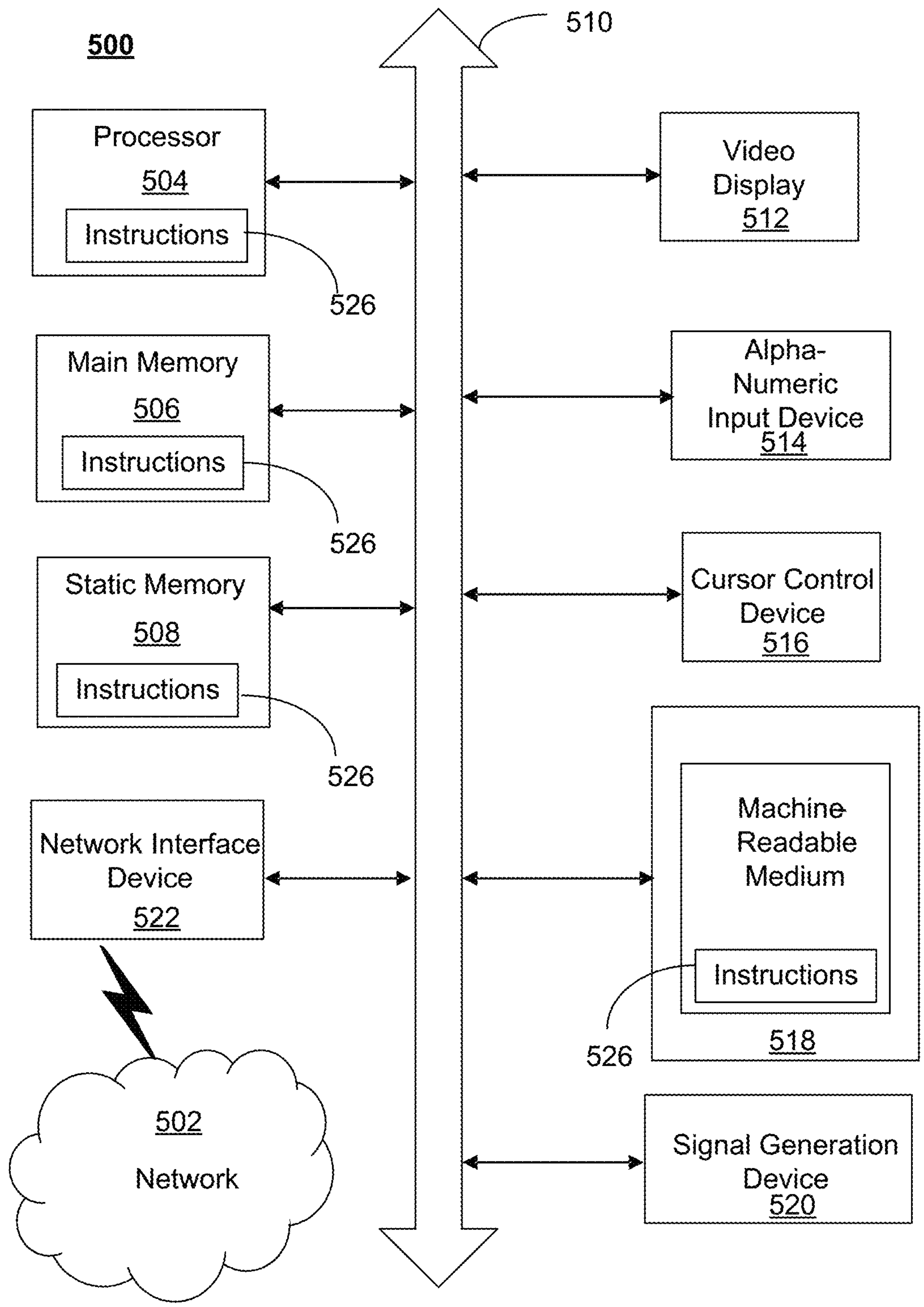
FIG. 5 illustrates an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, PE 101, PE 102, PE 103, gateway 106, network controller 108, game client 105, and other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which application-aware path selection and forwarding alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—application-aware path selection and forwarding—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for application-aware path selection and forwarding. A method, system, computer readable storage medium, or apparatus provides for receiving, by a provider edge (PE) device, application network requirements for an application; receiving data; determining that the data is indicative of data with the application; and when the application identified data is received, using an application forwarding table to direct the data to a next hop. The method, system, computer readable storage medium, or apparatus provides for creating an application routing table for the application. The determining that the data is indicative of data with the application based on source or destination internet protocol address or port number. The application may be a gaming application, a public safety application, or extended reality (XR) application (e.g., virtual reality or augmented reality). A method, system, computer readable storage medium, or apparatus provides for receiving a request from a user end device via an application programming interface (API); translating that request into network specific data; based on the translated request, spinning up a new instance on a provider edge router (e.g., new routing instance); and selectively placing border gateway protocol updates based on the new instance. All combinations in this paragraph (including the removal or addition of steps) are contemplated in a manner that is consistent with the other portions of the detailed description. The disclosed subject matter is extensible beyond BGP or gaming.

What is claimed:

1. A method comprising:

receiving, by a provider edge (PE) device including a processor, application network requirements for an application over a communication network from a client device via a network controller;

receiving, by the PE device, a source-destination routing value from each network node of a group of network nodes resulting in a group of source-destination routing values;

identifying, by the PE device, a first destination server associated with the application;

determining, by the PE device, that the first destination server does not meet a performance requirement associated with the application resulting in a first determination;

based on the first determination, identifying, by the PE device, a second destination server associated with the application;

determining, by the PE device, that the second destination server meets the performance requirement associated with the application resulting in a second determination;

based on the second determination, identifying, by the PE device, a next hop in the communication network for application data based on the application network requirements and the group of source-destination routing values;

storing, by the PE device, the next hop in an application forwarding table;

receiving, by the PE device, data over the communication network;

determining, by the PE device, that the data is indicative of data with the application; and in response to receiving the data, using, by the PE device, the application forwarding table to direct the data to the next hop in the communication network.

2. The method of claim 1, further comprising creating, by the PE device, an application routing table for the application.

3. The method of claim 1, wherein the determining, by the PE device, that the data is indicative of data with the application is based on source or destination internet protocol address.

4. The method of claim 1, wherein the determining, by the PE device, that the data is indicative of data with the application is based on source or destination port number.

5. The method of claim 1, wherein the application is a gaming application.

6. The method of claim 1, wherein the application is a public safety application.

7. The method of claim 1, wherein the application is an extended reality (XR) application.

8. An apparatus comprising:

a processing system including a processor; and memory coupled with the processor, the memory storing executable instructions that when executed by the processor cause the processor to effectuate operations comprising:

receiving application network requirements for an application over a communication network from a client device via a network controller;

receiving a source-destination routing value from each network node of a group of network nodes resulting in a group of source-destination routing values;

identifying a first destination server associated with the application;

determining that the first destination server does not meet a performance requirement associated with the application resulting in a first determination;

based on the first determination, identifying a second destination server associated with the application;

determining that the second destination server meets the performance requirement associated with the application resulting in a second determination;

based on the second determination, identifying a next hop in the communication network for application data based on the application network requirements and the group of source-destination routing values;

storing the next hop in an application forwarding table;

receiving data over the communication network;

determining that the data is indicative of data with the application; and in response to receiving the data, using the application forwarding table to direct the data to the next hop in the communication network.

9. The apparatus of claim 8, the operations further comprising creating an application routing table for the application.

10. The apparatus of claim 8, wherein the determining that the data is indicative of data with the application is based on source or destination internet protocol address.

11. The apparatus of claim 8, wherein the determining that the data is indicative of data with the application is based on source or destination port number.

12. The apparatus of claim 8, wherein the application is a gaming application.

13. The apparatus of claim 8, wherein the application is an extended reality (XR) application.

14. The apparatus of claim 8, wherein the apparatus comprises a provider edge router.

15. A computer readable storage medium storing computer executable instructions that when executed by a computing device including a processor cause said computing device to effectuate operations comprising:

receiving application network requirements for an application over a communication network from a client device via a network controller;

receiving a source-destination routing value from each network node of a group of network nodes resulting in a group of source-destination routing values;

identifying a first destination server associated with the application;

determining that the first destination server does not meet a performance requirement associated with the application resulting in a first determination;

based on the first determination, identifying a second destination server associated with the application;

determining that the second destination server meets the performance requirement associated with the application resulting in a second determination;

based on the second determination, identifying a next hop in the communication network for application data based on the application network requirements and the group of source-destination routing values;

storing the next hop in an application forwarding table;

receiving data over the communication network;

determining that the data is indicative of data with the application; and in response to receiving the data, using the application forwarding table to direct the data to the next hop in the communication network.

16. The computer readable storage medium of claim 15, the operations further comprising creating an application routing table for the application.

17. The computer readable storage medium of claim 15, wherein the determining that the data is indicative of data with the application is based on source or destination internet protocol address.

18. The computer readable storage medium of claim 15, wherein the determining that the data is indicative of data with the application is based on source or destination port number.

19. The computer readable storage medium of claim 15, wherein the application is a gaming application.

20. The computer readable storage medium of claim 15, wherein the application is an extended reality (XR) application.

* * * * *